United States Patent
Schwarz et al.

(10) Patent No.: US 10,036,351 B2
(45) Date of Patent: *Jul. 31, 2018

(54) GEARED TURBOFAN WITH THREE CO-ROTATING TURBINES

(75) Inventors: Frederick M. Schwarz, Glastonbury, CT (US); Daniel Bernard Kupratis, Wallingford, CT (US)

(73) Assignee: United Technologies Corporation, Farmington, CT (US)

(*) Notice: Subject to any disclaimer, the term of this patent is extended or adjusted under 35 U.S.C. 154(b) by 1427 days.

This patent is subject to a terminal disclaimer.

(21) Appl. No.: 13/437,304

(22) Filed: Apr. 2, 2012

(65) Prior Publication Data
US 2013/0255219 A1 Oct. 3, 2013

(51) Int. Cl.
| | |
|---|---|
| F02C 7/36 | (2006.01) |
| F02K 3/075 | (2006.01) |
| F02K 3/06 | (2006.01) |
| F02C 3/107 | (2006.01) |

(52) U.S. Cl.
CPC .............. *F02K 3/075* (2013.01); *F02C 3/107* (2013.01); *F02C 7/36* (2013.01); *F02K 3/06* (2013.01); *F05D 2220/36* (2013.01); *F05D 2260/40311* (2013.01)

(58) Field of Classification Search
CPC .... F02C 3/107; F02C 7/36; F02K 3/06; F05D 2220/36; F05D 2260/40311
See application file for complete search history.

(56) References Cited

U.S. PATENT DOCUMENTS

| | | | |
|---|---|---|---|
| 3,287,906 A | 11/1966 | McCormick | |
| 3,886,737 A * | 6/1975 | Grieb | ............ 60/226.1 |
| 4,651,521 A | 3/1987 | Ossi | |
| 5,160,251 A | 11/1992 | Ciokajlo | |
| 5,388,964 A | 2/1995 | Ciokajlo et al. | |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

NASA article "Gas Turbine Weight Model" from https://web.archive.org/web/20040604005228/http://www.grc.nasa.gov/WWW/K-12/airplane/turbwt.html; published in Jun. 4, 2004.*

(Continued)

*Primary Examiner* — Arun Goyal
(74) *Attorney, Agent, or Firm* — Carlson, Gaskey & Olds, P.C.

(57) ABSTRACT

A gas turbine engine has a fan rotor, a first compressor rotor and a second compressor rotor. The second compressor rotor compresses air to a higher pressure than the first compressor rotor. A first turbine rotor drives the second compressor rotor and a second turbine rotor. The second turbine drives the compressor rotor. A fan drive turbine is positioned downstream of the second turbine rotor. The fan drive turbine drives the fan rotor through a gear reduction. The first compressor rotor and second turbine rotor rotate as an intermediate speed spool. The second compressor rotor and first turbine rotor together as a high speed spool. The high speed spool, the intermediate speed spool, and the fan drive turbine rotate in the same direction.

16 Claims, 2 Drawing Sheets

(56) References Cited

U.S. PATENT DOCUMENTS

| | | | |
|---|---|---|---|
| 5,806,303 A | | 9/1998 | Johnson |
| 5,915,917 A | | 6/1999 | Eveker et al. |
| 6,732,502 B2 | | 5/2004 | Seda et al. |
| 7,219,490 B2 | * | 5/2007 | Dev .............................. 60/226.1 |
| 7,299,621 B2 | | 11/2007 | Bart et al. |
| 7,632,064 B2 | * | 12/2009 | Somanath et al. ............ 415/191 |
| 8,887,485 B2 | * | 11/2014 | Ress, Jr. ...................... 60/226.1 |
| 2006/0288686 A1 | | 12/2006 | Cherry et al. |
| 2008/0022692 A1 | | 1/2008 | Nagendra et al. |
| 2008/0098715 A1 | * | 5/2008 | Orlando et al. ............. 60/226.1 |
| 2009/0133380 A1 | * | 5/2009 | Donnerhack .............. 60/39.511 |
| 2009/0151317 A1 | | 6/2009 | Norris et al. |
| 2010/0148396 A1 | | 6/2010 | Xie et al. |
| 2010/0154384 A1 | | 6/2010 | Schilling |
| 2010/0331139 A1 | | 12/2010 | McCune |
| 2011/0056208 A1 | | 3/2011 | Norris et al. |
| 2011/0309187 A1 | | 12/2011 | Dev |

OTHER PUBLICATIONS

European Search Report for European Application No. 13813981.1 dated Mar. 18, 2015.

International Preliminary Report on Patentability for PCT Application No. PCT/US2013/034537, dated Oct. 16, 2014.

International Search Report and Written Opinion for International Application No. PCT/US2013/034537 completed on Jan. 15, 2014.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

NASA, Engine Weight Model, Glenn Research Center, retrieved from, http://www.grc.nasa.gov/WWW/K-12/airplane/turbwt.html, Mar. 11, 2016.

\* cited by examiner

GEARED TURBOFAN WITH THREE CO-ROTATING TURBINES

BACKGROUND

This application relates to a gas turbine having three turbine sections, with one of the turbine sections driving a fan through a gear change mechanism.

Gas turbine engines are known, and typically include a compressor section compressing air and delivering the compressed air into a combustion section. The air is mixed with fuel and combusted, and the product of that combustion passes downstream over turbine rotors.

In one known gas turbine engine architecture, there are two compressor rotors in the compressor section, and three turbine rotors in the turbine section. A highest pressure turbine rotates a highest pressure compressor. An intermediate pressure turbine rotates a lower pressure compressor, and a third turbine section is a fan drive turbine which drives the fan.

SUMMARY

In a featured embodiment, a gas turbine engine has a fan rotor, first and second compressor rotors, with the second compressor rotor compressing air to a higher pressure than the first compressor rotor. A first turbine rotor drives the second compressor rotor and a second turbine rotor. The second turbine drives the first compressor rotor. A fan drive turbine is positioned downstream of the second turbine rotor, and drives the fan rotor through a gear reduction. The first and second compressor rotors rotate as an intermediate speed spool. The second compressor rotor and first turbine rotor rotate together as a high speed spool, with the high speed spool, the intermediate speed spool, and the fan drive turbine rotating in the same direction.

In another embodiment according to any of the previous embodiments, the fan rotor is driven by the gear reduction to rotate in the same direction as the fan drive turbine.

In another embodiment according to any of the previous embodiments, a power density of the engine is greater than or equal to about 1.5 lbs/in$^3$, and less than or equal to about 5.5 lbf/in$^3$.

In another embodiment according to any of the previous embodiments, the power density is defined as a ratio of thrust produced by the engine expressed in pounds force to a volume of a turbine section incorporating each of the first turbine rotor, second turbine rotor and fan drive turbine rotor, expressed in cubic inches.

In another embodiment according to any of the previous embodiments, the ratio is greater than or equal to 2.0.

In another embodiment according to any of the previous embodiments, the ratio is greater than or equal to about 4.0.

In another embodiment according to any of the previous embodiments, the thrust is sea level take-off flat-rated static thrust.

In another embodiment according to any of the previous embodiments, the fan rotor delivers a portion of air into a bypass duct and into the first compressor rotor as core flow.

In another embodiment according to any of the previous embodiments, a mid-turbine frame is positioned between the first and second turbine rotors.

In another embodiment according to any of the previous embodiments, a vane is positioned between the mid-turbine frame and second turbine rotor.

In another embodiment according to any of the previous embodiments, a vane is positioned between the second turbine rotor and fan drive turbine.

In another embodiment according to any of the previous embodiments, a vane is positioned between the second turbine rotor and fan drive turbine.

In another embodiment according to any of the previous embodiments, a mid-turbine frame is positioned between the first and second turbine rotors.

In another embodiment according to any of the previous embodiments, a vane is positioned between the mid-turbine frame and second turbine rotor.

In another embodiment according to any of the previous embodiments, a vane is positioned between the second turbine rotor and fan drive turbine.

In another embodiment according to any of the previous embodiments, a vane is positioned between the second turbine rotor and fan drive turbine.

In another featured embodiment, a gas turbine engine has a fan rotor, first and second compressor rotors, with the second compressor rotor compressing air to a higher pressure than the first compressor rotor. A first turbine rotor drives the second compressor rotor, and a second turbine rotor, with the second turbine driving the first compressor rotor. A fan drive turbine is positioned downstream of the second turbine rotor. The fan drive turbine drives the fan rotor through a gear reduction. The first compressor rotor and second turbine rotor rotate as an intermediate speed spool. The second compressor rotor and first turbine rotor rotate together as a high speed spool rotating in the same direction as the intermediate speed spool. The fan drive turbine also rotates in the same direction. The fan rotor is driven by the speed reduction to rotate in the same direction as the fan drive turbine. A power density of the engine is greater than or equal to about 1.5 lbf/in$^3$, and less than or equal to about 5.5 lbf/in$^3$. The power density is defined as a ratio of thrust produced by the engine expressed in pounds force to a volume of a turbine section incorporating each of the first turbine rotor, second turbine rotor and fan driving turbine rotor, expressed in cubic inches.

In another embodiment according to any of the previous embodiments, the ratio is greater than or equal to 2.0.

In another embodiment according to any of the previous embodiments, the ratio is greater than or equal to about 4.0.

In another embodiment according to any of the previous embodiments, the thrust is sea level take-off flat-rated static thrust.

These and other features of the invention would be better understood from the following specifications and drawings, the following of which is a brief description.

DETAILED DESCRIPTION

Figure 1:
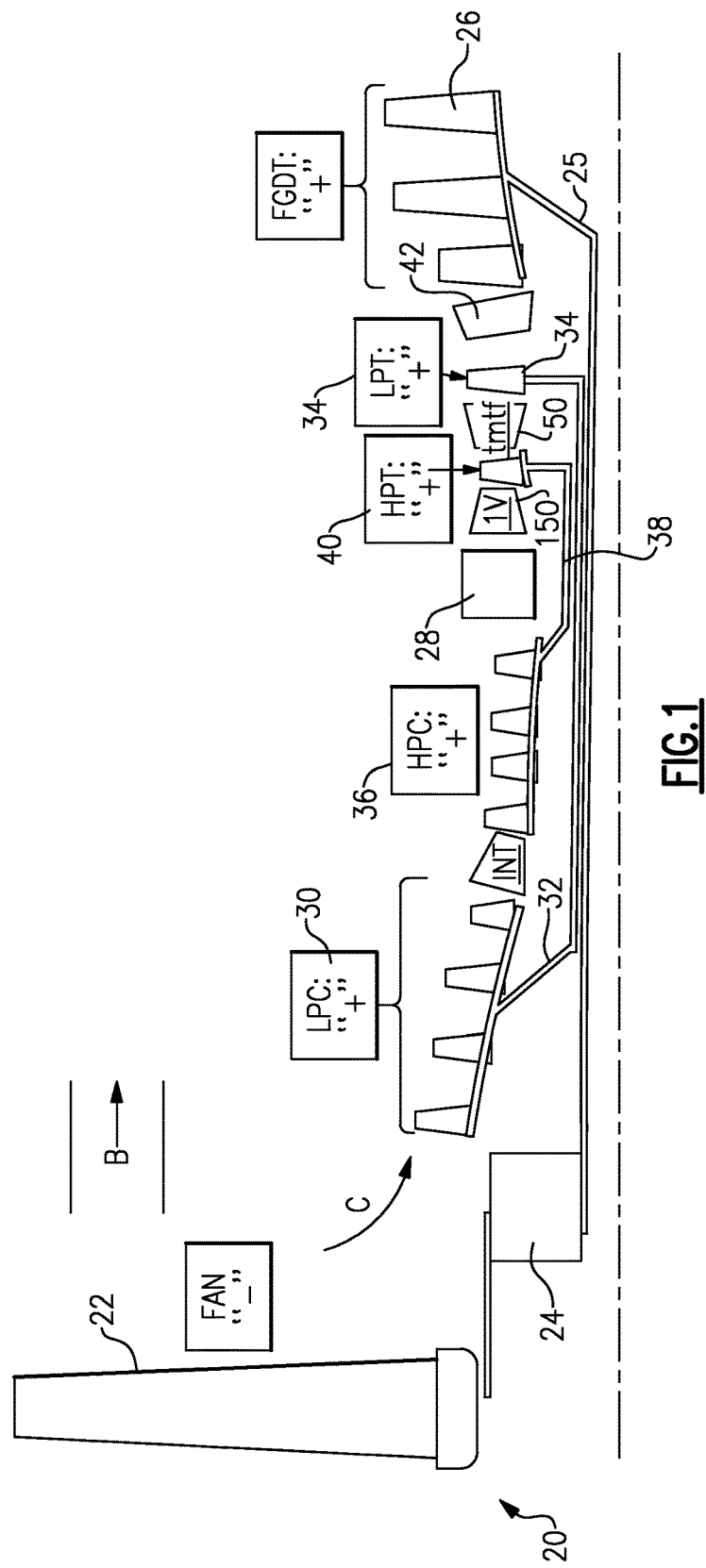
FIG. 1 schematically shows a gas turbine engine.

A gas turbine engine 20 is illustrated in FIG. 1, and incorporates a fan 22 driven through a gear reduction 24. The gear reduction 24 is driven with a low speed spool 25 by a fan/gear drive turbine ("FGDT") 26. Air is delivered from the fan as bypass air B, and into a low pressure compressor 30 as core air C. The air compressed by the low pressure compressor 30 passes downstream into a high pressure compressor 36, and then into a combustion section 28. From the combustion section 28, gases pass across a high pressure turbine 40, low pressure turbine 34, and fan/gear drive turbine 26.

A plurality of vanes and stators 50, 150 and 42 may be mounted between the several turbine sections. In particular, as shown, the low pressure compressor 30 rotates with an intermediate pressure spool 32 and the turbine 34 in a first ("+") direction. The fan drive turbine 26 rotates with a shaft 25 in the same ("+") direction as the low pressure spool 32. The speed change gear 24 may cause the fan 22 to rotate in the opposite ("−") direction. However, the fan rotating in the same direction would come within the scope of this invention. As is known within the art and as illustrated, a star gear arrangement may be utilized for the fan to rotate in an opposite direction as to the fan/gear drive turbine 26. On the other hand, a planetary gear arrangement may be utilized, wherein the two rotate in the same direction. The high pressure compressor 36 rotates with a spool 38 and is driven by a high pressure turbine 40 in the direction ("+") as to the spool 32 and shaft 25.

Since the turbines 34, 40 and 26 are rotating in the same direction, high cambered vanes 50 and 42 may be incorporated between these sections. The vane 50 may be incorporated into a mid-turbine frame (as an air turning mid-turbine frame ("tmtf") vane) which also provides a support for the high pressure turbine rotor 40 or may be a separate vane.

The fan drive turbine 26 in this arrangement can operate at a higher speed than other fan drive turbine arrangements. The fan drive turbine can have shrouded blades, which provides design freedom.

The low pressure compressor may have more than three stages. The fan drive turbine has at least two, and up to six stages. The high pressure turbine as illustrated may have one or two stages, and the low pressure turbine may have one or two stages.

The above features achieve a more compact turbine section volume relative to the prior art, including both the high and low pressure turbines. A range of materials can be selected. As one example, by varying the materials for forming the low pressure turbine, the volume can be reduced through the use of more expensive and more exotic engineered materials, or alternatively, lower priced materials can be utilized. In three exemplary embodiments the first rotating blade of the fan drive turbine can be a directionally solidified casting blade, a single crystal casting blade or a hollow, internally cooled blade. All three embodiments will change the turbine volume to be dramatically smaller than the prior art by increasing low pressure turbine speed.

Due to the compact turbine section, a power density, which may be defined as thrust in pounds force produced divided by the volume of the entire turbine section, may be optimized. The volume of the turbine section may be defined by an inlet of a first turbine vane in the high pressure turbine to the exit of the last rotating airfoil in the fan/gear drive turbine 26, and may be expressed in cubic inches. The static thrust at the engine's flat rated Sea Level Takeoff condition divided by a turbine section volume is defined as power density. The sea level take-off flat-rated static thrust may be defined in pounds force, while the volume may be the volume from the annular inlet of the first turbine vane in the high pressure turbine to the annular exit of the downstream end of the last rotor section in the fan drive turbine. The maximum thrust may be sea level take-off thrust "SLTO thrust" which is commonly defined as the flat-rated static thrust produced by the turbofan at sea-level.

Figure 2:
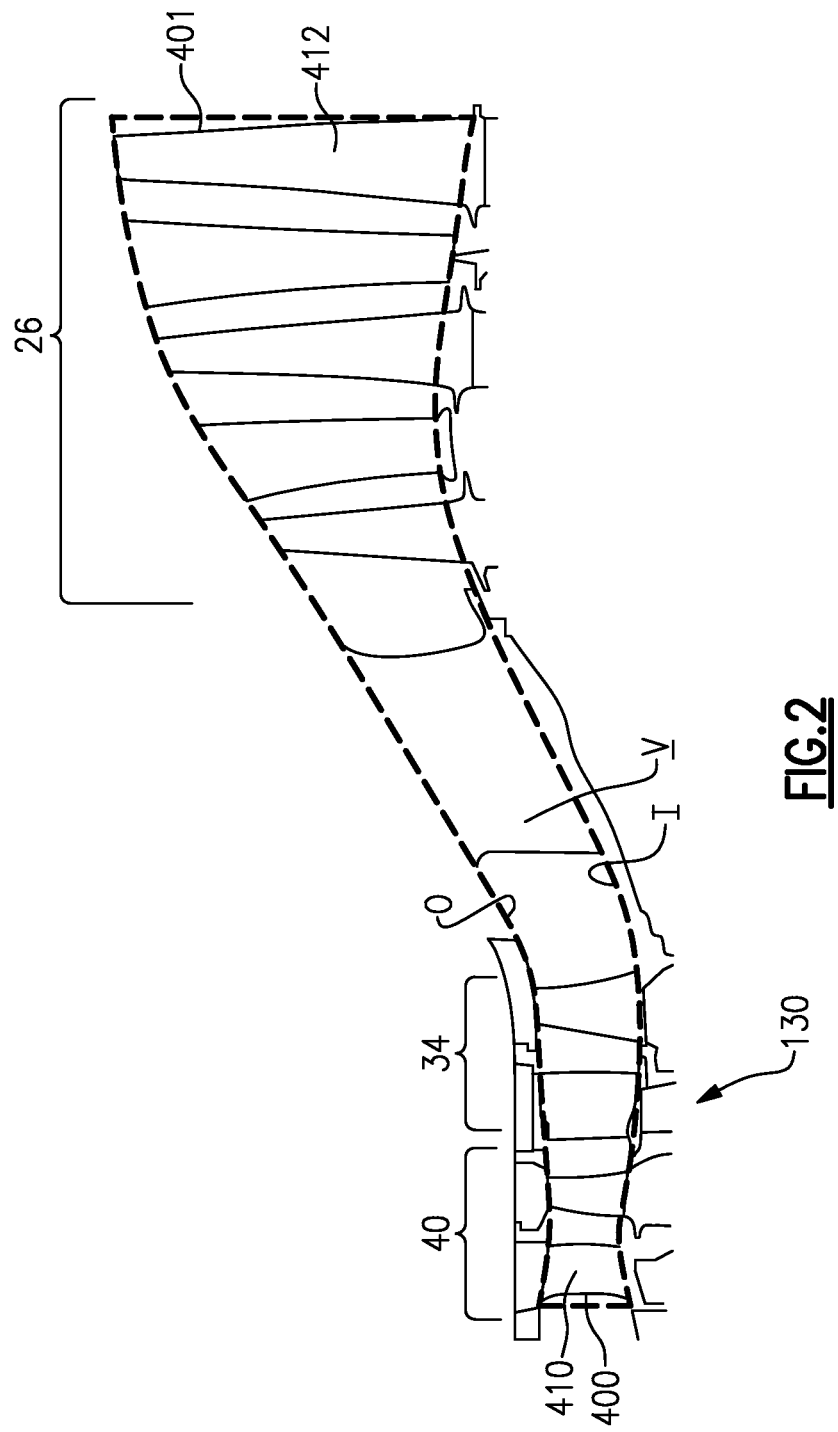
FIG. 2 shows how a volume of the turbine section can be calculated.

The volume V of the turbine section may be best understood from FIG. 2. The high pressure turbine rotor is illustrated at 40, the low pressure turbine rotor at 34, and the fan drive turbine rotor at 26. The volume V is illustrated by dashed line, and extends from an inner periphery I to an outer periphery O. The inner periphery is somewhat defined by the flowpath of the rotors, but also by the inner platform flow paths of vanes. The outer periphery is defined by the stator vanes and outer air seal structures along the flowpath. The volume extends from a most upstream 400 end of the most upstream blade 410 in high pressure turbine section 40, typically its leading edge, and to the most downstream edge 401 of the last rotating airfoil 412 in the fan drive turbine section 26. Typically, this will be the trailing edge of that airfoil. Mid-turbine frames and vanes as illustrated in FIG. 1 may be included.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in$^3$) |
|---|---|---|---|
| 1 | 17,000 | 3,859 | 4.4 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.1 |
| 6 | 96,500 | 62,172 | 1.55 |
| 7 | 96,500 | 46,629 | 2.07 |
| 8 | 37,098 | 6,745 | 5.50 |

Thus, in embodiments, the power density would be greater than or equal to about 1.5 lbf/in$^3$. More narrowly, the power density would be greater than or equal to about 2.0 lbf/in$^3$.

Even more narrowly, the power density would be greater than or equal to about 3.0 lbf/in$^3$.

More narrowly, the power density is greater than or equal to about 4.0 lbf/in$^3$.

Also, in embodiments, the power density is less than or equal to about 5.5 lbf/in$^3$.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 24 is an epicyclic gear train, such as a star gear system or other gear system, with a gear reduction ratio of greater than about 2.3 and the fan/gear drive turbine section 26 has a pressure ratio that is greater than about 5. In one disclosed embodiment, the engine 20 bypass ratio is greater than about ten (10:1), the fan diameter is significantly larger than that of the low pressure compressor section 30, and the fan/gear drive turbine section 26 has a pressure ratio that is greater than about 5:1. In some embodiments, the high pressure turbine section 40 may have two or fewer stages. In contrast, the fan/gear drive turbine section 26, in some embodiments, has between two and six stages. Further the fan/gear drive turbine section 26 pressure ratio is total pressure measured prior to inlet of fan/gear drive turbine section 26 as related to the total pressure at the outlet of the fan/gear drive turbine section 26 prior to an exhaust nozzle. The geared architecture 24 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")." TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 22 may have 26 or fewer blades.

Engines made with the disclosed architecture, and including turbine sections as set forth in this application, and with modifications coming from the scope of the claims in this application, thus provide very high efficient operation, and increased fuel efficiency and lightweight relative to their trust capability.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan rotor, a first compressor rotor and a second compressor rotor, said second compressor rotor compressing air to a higher pressure than said first compressor rotor;
   a first turbine rotor, said first turbine rotor driving said second compressor rotor, and a second turbine rotor, said second turbine rotor driving said first compressor rotor;
   a fan drive turbine positioned downstream of said second turbine rotor, said fan drive turbine driving said fan rotor through a gear reduction;
   said first compressor rotor and said second turbine rotor rotating as an intermediate speed spool, and said second compressor rotor and said first turbine rotor rotating together as a high speed spool, with said high speed spool, said intermediate speed spool, and said fan drive turbine rotating in the same direction; and
   a power density of the engine is greater than or equal to about 1.5 lbf/in$^3$, and less than or equal to about 5.5 lbf/in$^3$, said power density being defined as a ratio of thrust produced by said engine expressed in pounds force to a volume of a turbine section incorporating each of said first turbine rotor, said second turbine rotor and said fan drive turbine rotor, expressed in cubic inches, and said thrust is sea level take-off flat-rated static thrust.

2. The engine as set forth in claim 1, wherein said ratio is greater than or equal to 2.0.

3. The engine as set forth in claim 2, wherein said ratio is greater than or equal to about 4.0.

4. The engine as set forth in claim 1, wherein said fan rotor delivering a portion of air into a bypass duct and a portion of air into said first compressor rotor as core flow.

5. The engine as set forth in claim 4, wherein a mid-turbine frame is positioned between said first turbine rotor and said second turbine rotor.

6. The engine as set forth in claim 5, wherein a vane is positioned between said mid-turbine frame and said second turbine rotor.

7. The engine as set forth in claim 6, wherein a vane is positioned between said second turbine rotor and said fan drive turbine.

8. The engine as set forth in claim 4, wherein a vane is positioned between said second turbine rotor and said fan drive turbine.

9. The engine as set forth in claim 1, wherein a mid-turbine frame is positioned between said first turbine rotor and said second turbine rotor.

10. The engine as set forth in claim 9, wherein a vane is positioned between said mid-turbine frame and said second turbine rotor.

11. The engine as set forth in claim 10, wherein a vane is positioned between said second turbine rotor and said fan drive turbine.

12. The engine as set forth in claim 1, wherein a vane is positioned between said second turbine rotor and said fan drive turbine.

13. A gas turbine engine comprising:
   a fan rotor, a first compressor rotor and a second compressor rotor, said second compressor rotor compressing air to a higher pressure than said first compressor rotor;
   a first turbine rotor, said first turbine rotor driving said second compressor rotor, and a second turbine rotor, said second turbine rotor driving said first compressor rotor;
   a fan drive turbine positioned downstream of said second turbine rotor, said fan drive turbine driving said fan rotor through a gear reduction;
   said first compressor rotor and said second turbine rotor rotating as an intermediate speed spool, and said second compressor rotor and said first turbine rotor rotating together as a high speed spool, with said high speed spool, said intermediate speed spool, and said fan drive turbine rotating in the same direction;
   said fan rotor being driven by said speed reduction to rotate in the same direction as said fan drive turbine;
   a power density of the engine being greater than or equal to about 1.5 lbf/in$^3$, and less than or equal to about 5.5 lbf/in$^3$; and
   said power density defined as a ratio of thrust produced by said engine expressed in pounds force to a volume of a turbine section incorporating each of said first turbine rotor, said second turbine rotor and said fan driving turbine rotor, expressed in cubic inches.

14. The engine as set forth in claim 13, wherein said ratio is greater than or equal to 2.0.

15. The engine as set forth in claim 14, wherein said ratio is greater than or equal to about 4.0.

16. The engine as set forth in claim 15, wherein said thrust is sea level take-off flat-rated static thrust.

* * * * *